June 23, 1959 — I. M. NEITLICH — 2,891,282
MOLDING APPARATUS FOR MAKING SMALL PLASTIC ARTICLES
Filed Jan. 8, 1954 — 5 Sheets-Sheet 3

INVENTOR.
IRVING M. NEITLICH
BY
his ATTORNEYS

June 23, 1959   I. M. NEITLICH   2,891,282
MOLDING APPARATUS FOR MAKING SMALL PLASTIC ARTICLES
Filed Jan. 8, 1954   5 Sheets-Sheet 4
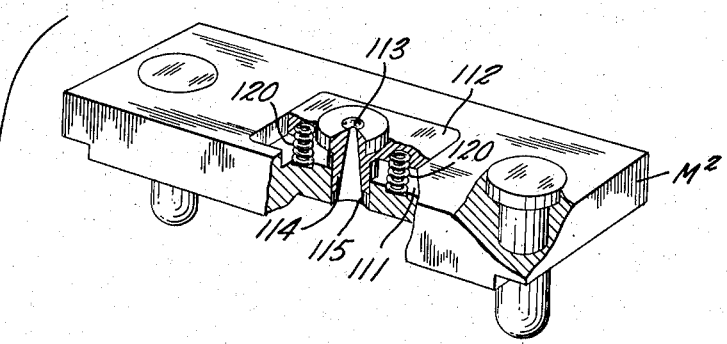
FIG. 4.
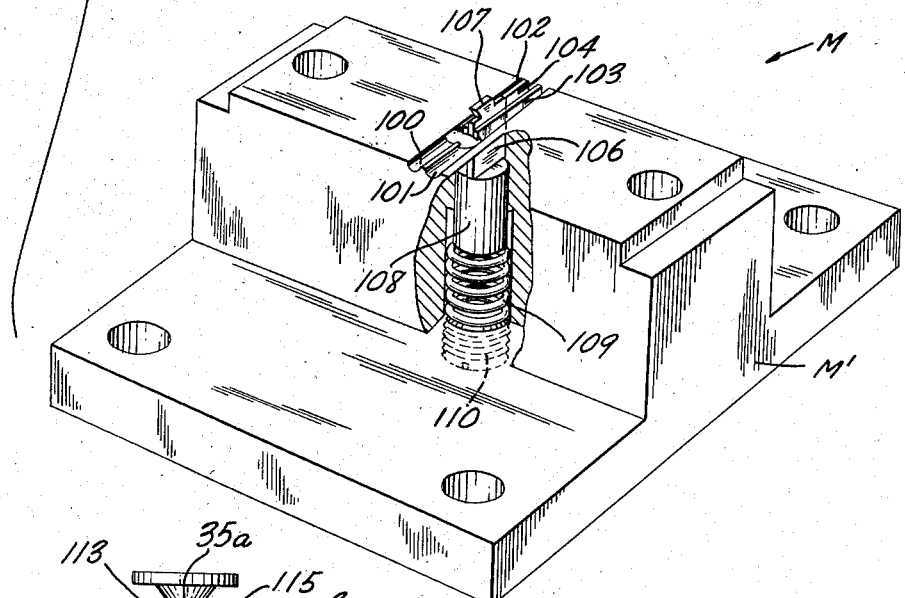
FIG. 5.
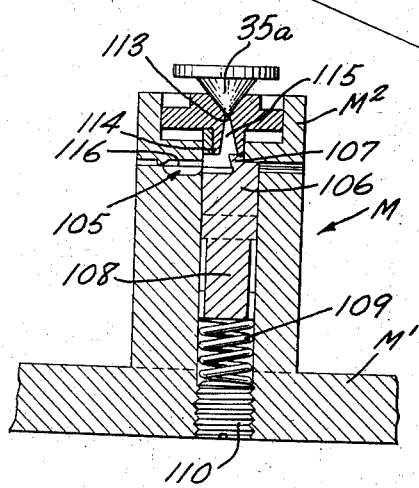
INVENTOR.
IRVING M. NEITLICH
BY
Campbell, Brumbaugh, Free & Graves
his ATTORNEYS June 23, 1959     I. M. NEITLICH     2,891,282
MOLDING APPARATUS FOR MAKING SMALL PLASTIC ARTICLES
Filed Jan. 8, 1954     5 Sheets-Sheet 5
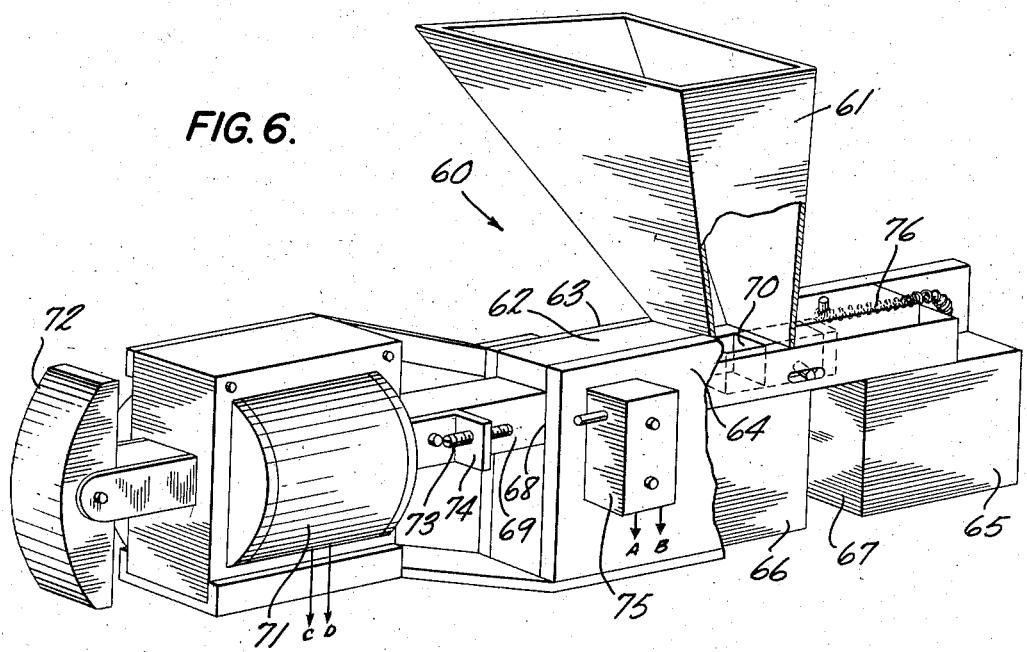
INVENTOR.
IRVING M. NEITLICH United States Patent Office 2,891,282
Patented June 23, 1959

2,891,282
MOLDING APPARATUS FOR MAKING SMALL PLASTIC ARTICLES

Irving M. Neitlich, Stamford, Conn., assignor, by mesne assignments, to Cue Fastener, Inc., a corporation of New York Application January 8, 1954, Serial No. 402,843

7 Claims. (Cl. 18—30)

This invention relates to apparatus for molding articles from plastics and the like and it relates particularly to an improved form of injection molding apparatus for manufacturing small plastic articles at high production rates.

Heretofore, the injection molding devices for making articles from plastics such as "nylon" and the like, are designed to make molded articles based on maximum weight. Although a machine of high capacity can mold small shots, it is uneconomical to do so. Machines with a maximum small enough to run miniature shots economically are not available commercially. When it is desired to mold smaller articles, it is usually the practice to use gang molds to cast clusters of the small articles. For many purposes, the gang mold type of device cannot be used. For example, in the manufacture of slide fasteners, it is usual to provide stops for preventing the slider from running off the ends of the rows of fastener elements. It is necessary to handle the slide fasteners individually or in continuous lengths and to mold the stops individually or in pairs at opposite ends of the individual fasteners. Such operations cannot be accomplished with a cluster or gang molding device. Moreover, inasmuch as the stops weigh on the order of a tenth of a gram or even less, the smallest injection molding devices provided heretofore are much too large for the purpose. Moreover, the slow molding cycle of such prior devices, on the order of 15 seconds per unit, is much too slow for the purpose required.

The present invention provides an injection molding device which is capable of molding stops for slide fasteners and other small lightweight articles weighing a gram or less at a production rate of four to five hundred units per hour, and even more.

The new molding apparatus embodies a novel type of heating chamber for rendering the plastic material fluid or flowable and a novel type of mold which is charged with the plastic and can be operated to trim, cool and release the article quickly to maintain the high production rate required for economical operation.

For a better understanding of the present invention, reference may be had to the accompanying drawings, in which:

Fig. 4 is a perspective view of the mold for the machine shown with the mold sections separated;

Fig. 5 is a view in vertical section through the mold with the mold closed;

Fig. 6 is a perspective view of the feeding mechanism for supplying the finely divided plastic to the molding machine, parts of the device being broken away to disclose details thereof; and Fig. 7 is a schematic wiring diagram of the controls for the feeding mechanism.

Figure 1:
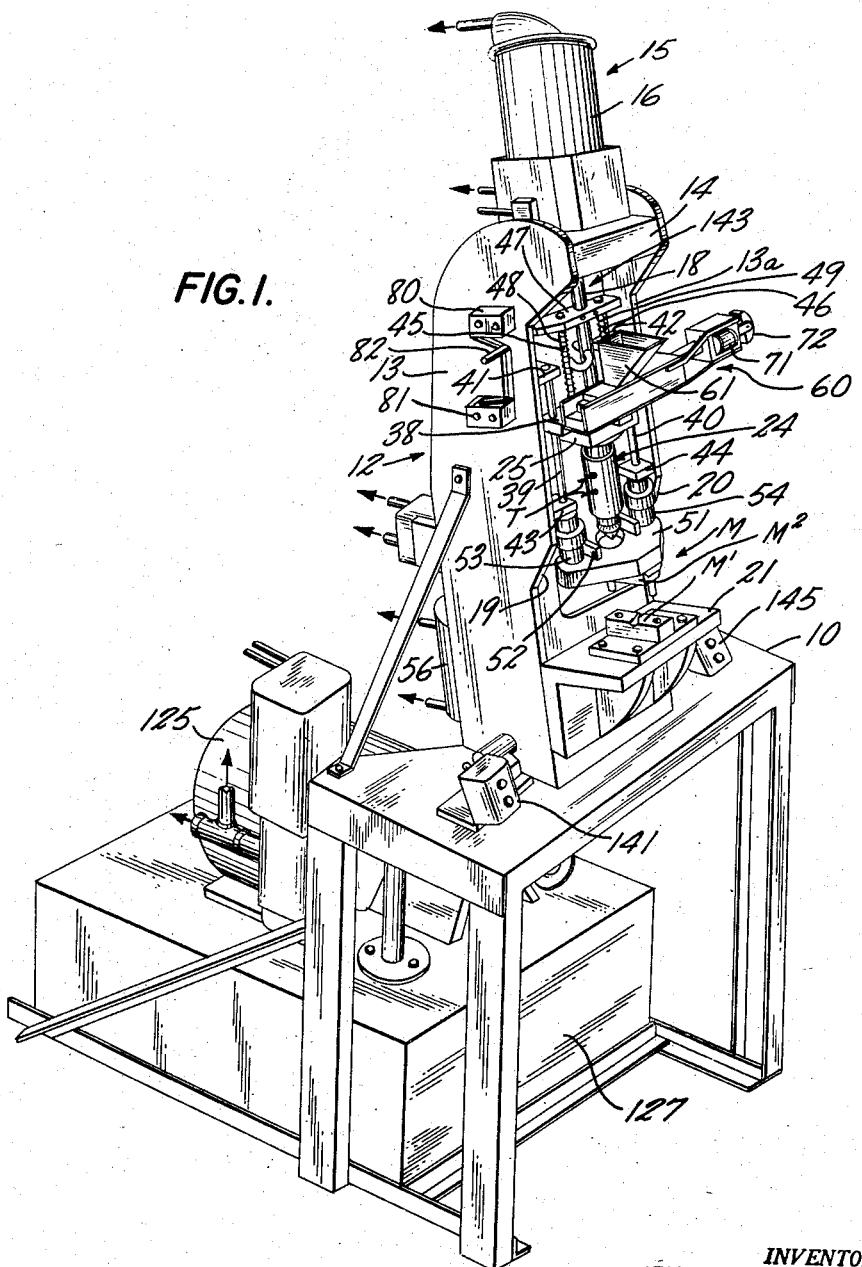
Fig. 1 is a perspective view of an injection molding machine of the type embodying the present invention.

The invention will be described with reference to an injection molding machine of the type embodying the present invention which is designed and constructed for molding stops on slide fasteners, the stops being of a very small size and weighing on an average about one-tenth of a gram. The mold construction described hereinafter is used for molding bottom stops on such slide fasteners although it will be understood that the mold and the molding apparatus can be modified very substantially to produce other small articles quite different from the stops on slide fasteners.

The device chosen for purposes of illustration includes a table-like base 10 formed of steel or any other similar material which may be used to house equipment used in the operation of the machine. Pivotally mounted on the top 11 of the table is a standard 12 consisting of a pair of spaced-apart side plates 13 and 13a which have upper ends joined by a transverse top plate 14 to form a rigid platform on which is mounted a hydraulic jack or ram 15. The ram 15 has a cylinder 16 which is fixed to the transverse plate 14 and it also has a ram or piston rod 18 which extends down between the side plates 13 and 13a.

The lower ends of the side plates 13 and 13a are cut away to form recesses 19 and 20 to give access from the front and both sides to a supporting plate or platen 21 mounted at the lower end of the frame 12 and used to support the lower half $M^1$ of a mold M, which is described later herein.

Figure 3:
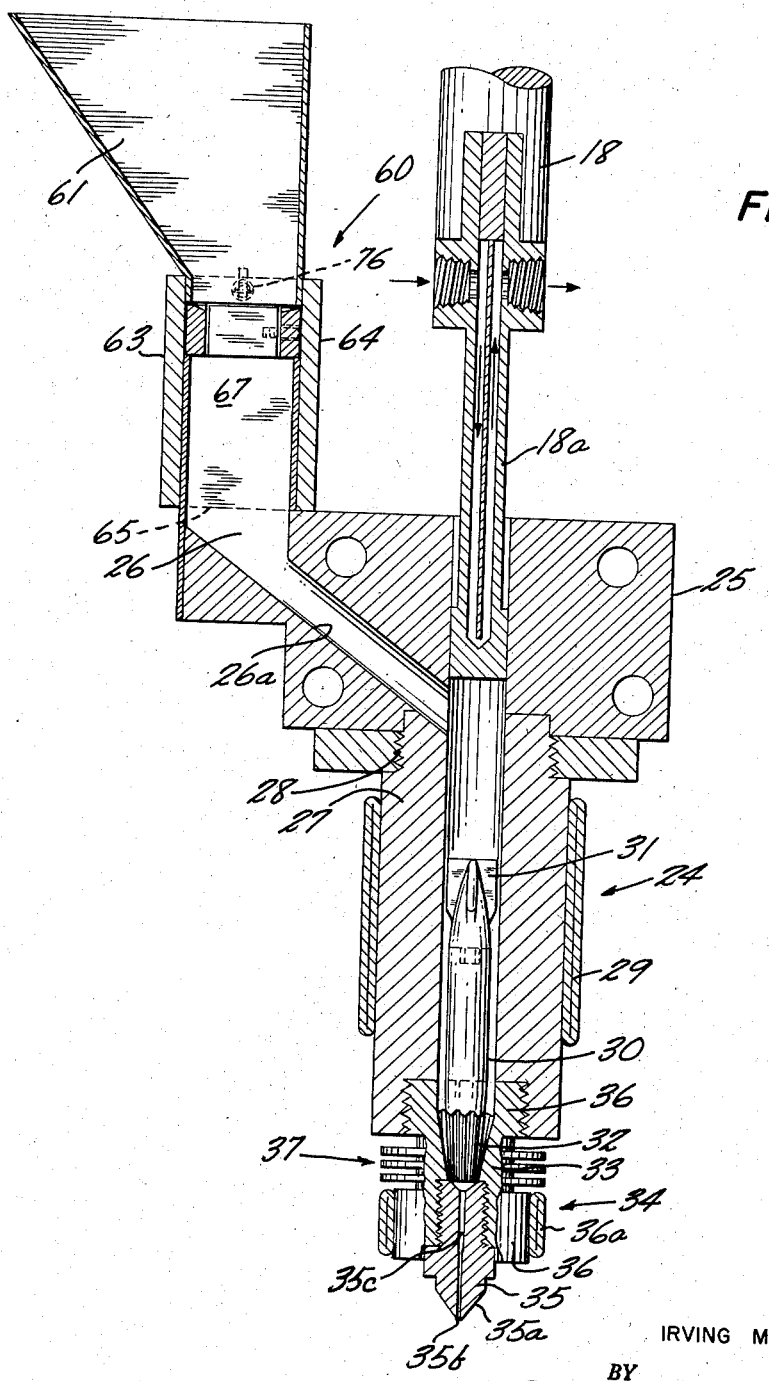
Fig. 3 is a view in longitudinal section through the heating and feeding cylinder and nozzle of the machine.

The piston rod 18 of the ram is used to force plastic material down through a melting and depositing or injecting head 24 which introduces the molten plastic into the mold. As shown in Fig. 3, the head 24 consists of a cylinder support 25 which may or may not be cooled by means of circulating water. It is preferred to have it cooled and to that end it may be provided with suitable passages for water. Through the center of cylinder support 25 a hole is bored to fit a water cooled extension 18a of the piston rod 18. The forward edge of the support 25 carries a funnel 26 which leads to an inclined passage 26a through the cylinder support 25 into the cylinder 27. Cylinder 27 is attached to the lower end of the cylinder support 25 by any suitable means, such as the screw threaded connection 28. Cylinder 27 is heated by an electric heating element 29 which encompasses the upper ⅔ of cylinder 27. The temperature of the cylinder 27, and the plastic therein, is indicated and controlled by a suitable controlling pyrometer by means of thermocouple T.

The cylinder 27 and associated elements are of unique construction. The cylinder 27 consists of a metal tube to receive the plastic material which is introduced into its side. Mounted within the tube near its lower end is a torpedo 30 which divides the plastic material and causes it to flow in a relatively thin layer between the outside of the torpedo and the inner wall of the cylinder 27. As indicated by the name "torpedo," the number 30 is torpedo-like in shape having centering or supporting fins 31 at its upper end and a conical fluted nose 32 which rests in a conical cavity 33 in the top of nozzle assembly 34. The fluted nose portion 32 of the torpedo provides passages through which the plastic can flow into the injection nozzle 35 of the device. The nozzle 35 has a conical lower end 35a provided with a tapered sprue opening 35b therein and a slightly enlarged axial cavity 35c through which the molten plastic flows. The nozzle 35 is demountably supported in a removable heating section 36 which is screwed into the lower end of the cylinder 27. The nozzle heating section 36 is also formed of metal and has an electric heating element 36a which maintains the nose and the nozzle 35 at a sufficiently high temperature to assure fluidity of plastic. To aid in maintaining the plastic at the proper fluidity and temperature at the nozzle 35, cooling fins 37 are formed on the heating section 36 above the heating element 36a. The fins reduce the temperature of the plastic and its fluidity by dissipating excess heat reqired to melt the plastic in the cylinder. The heating element 36a then brings the plastic to just the right temperature for injection without any substantial excess of heat. In this way the plastic is maintained sufficiently fluid to allow its ejection from the nozzle without being at such a high temperature that cooling and hardening is prolonged after discharge of the plastic.

The heating and injecting unit 24 described above is mounted for up and down movement between the side plates 13 and 13a. To this end, the sides of the cylinder support 25 are provided with wing-like extensions 38 on each side thereof which are slidably received on rods 39 and 40 fixed at their upper ends to the flanges 41 and 42 and at their lower ends to the flanges 43 and 44 on the side plates 13, 13a. The cylinder support 25 is further carried on the headed rods 45, 46 which are fixed at one end into cylinder support 25 and slidably mounted at their upper ends in the crossbar 47 which is fixed to the piston rod 18. The support 25 is normally urged down to engage the headed ends of the rods 45 and 46 against the top of the bar 47 by means of springs 48, 49. When piston rod 18 is in its lower position, the crossbar 47 compresses the springs 48 and 49 to move the support 25 and the heater and injection nozzle down. When the piston 18 retracts, the springs hold assembly 24 until the piston has retracted far enough to cause the heads on the rods 45, 46 to engage bar 47, thereby lifting the assembly 24 upwardly.

In order to force the plastic material through at sufficient pressure to inject it into the mold, the piston 18 is used as follows:

The hydraulic ram 16 is so arranged that the piston 18 may be retracted to clear the passage 26a so that the granular or finely divided plastic can be introduced into it. Hydraulic pressure is supplied to the cylinder from a suitable source, such as a pump, described hereinafter, in order to force the ram downwardly so that it passes through the bore in support 25 and enters the top of the cylinder 27. The piston 18 fits the cylinder closely so that downward movement of the piston in the cylinder forces the molten plastic material out through the opening 35a into the mold M. Also, the pressure exerted by the piston and the springs 48 and 49 moves the entire heating and depositing unit 24 downwardly so that the nozzle 35 comes into tight engagement with and seats in the sprue opening of the mold M, described hereinafter.

The mold M is a two-part mold and has its lower portion M¹ supported by the platen 21 as indicated above and its top section M² supported by a plate 51 which is slidably mounted on the lower ends of the rods 39 and 40 below the flanges 43 and 44. The plate 51 is held in place by a lever or arm 52 pivotally mounted between the side plates 13 and 13a of the standard 12. The plate 51 has upwardly extending collars 53, 54 to engage the rods 39 and 40 and prevent tilting of the plate 51.

The rear end of the lever 52 is connected to the piston rod 55 of a hydraulic cylinder 56. The cylinder 56 can be operated to lower the upper platen or supporting plate 51 to press the mold sections together, or raised to separate the mold sections. The cylinder 56 and the ram 16 may be operated by means of a motor-driven timing or sequence switch or a suitable electronic device as described hereinafter.

While the heating and injecting nozzle 24 may be supplied manually with plastic through the funnel 26, it is preferred to utilize an automatic feeding device 60 of the type shown in Fig. 1 and in detail in Figs. 6 and 7. The feeding device 60 includes a hopper 61 which is mounted on a supporting block 62 secured between the upper edges of a pair of side plates 63 and 64. A block 65 is interposed between the plates 63 and 64 at one end thereof and is secured to the supporting block 25 in any suitable way. The block 65 and a second spacer block 66 are spaced apart lengthwise of the plates 62 and 63 to provide a discharge passage 67 overlying the funnel 26. The blocks 65 and 66 have their upper edges spaced from the plate 62 to provide a generally rectangular opening 68 for receiving a gate valve slide 69. The slide 69 is provided with an opening 70 extending through it which can be moved from below the hopper 61 to above the passage 67. Thus, when the opening 70 is positioned below the hopper 61, it can receive the granulated or finely divided plastic therefrom and when moved into alignment with the passage 67, the plastic is discharged into the funnel 26 and through the passage 26a into the melting cylinder 27.

The slide 69 is moved by means of a solenoid coil 71 through which the end of the slide passes. The outer end of the slide is provided with an armature 72 so that upon energization of the solenoid, the slide is pushed toward the right to discharge the plastic into the passage 67. The slide carries an adjustable screw 73 in a bracket 74 on the side of the slide for engagement with the plunger of a control switch 75.

A spring 76 is connected between the slide 69 and one of the frame plates 62 or 63 to normally urge the slide to the left, as viewed in Fig. 6.

The above-described feeding mechanism is associated with the piston rod 18 in such a way as to obtain a controlled feeding of the plastic to the heating cylinder. The feeding mechanism is not necessarily actuated upon every up-and-down movement of the piston rod 18 but is so arranged that it will maintain a sufficient amount of plastic in the melting cylinder 27 to allow proper feeding without overfilling the cylinder. It has been difficult heretofore to properly proportion the feeding of plastic to molding devices of the type indicated by automatic means because of variations in the weight-volume ratio of finely divided plastic.

Referring now to Figs. 1 and 6, it will be seen that the apparatus is provided with upper and lower switches 80 and 81 mounted on the side plate 13 in the path of a rod 82 which may be moved with the piston rod 18. If desired, and as shown in Fig. 7, instead of one rod 82, a pair of spaced apart arms 82a, 82b may be adjustably mounted on an upright rod 83 which is connected to the piston rod 18 by means of a laterally extending bracket 84.

It will be seen that the switch 75 is connected by means of the conductor 86 to one power terminal A and the other power terminal B is connected to one side of the normally open switch 81. The terminal A of the switch 75 is connected by means of conductor 87 to one terminal 88a of a relay type switch 88. The opposite side of the switch 81 is also connected by means of a conductor 89 to a contact 88b of the switch 88. The opposite coacting contact 88c is connected by means of a conductor 90 to the terminal B of switch 75.

The normally open switch 80 has one contact connected by a conductor 91 to one terminal D of solenoid 71 while the other terminal C of the solenoid is connected by the conductor 92 to the contact 88d of the switch 88. The opposed contact 88e is connected to one end of the relay winding 88f, the opposite end of the winding being connected to the conductor 89.

The other contact of the switch 80 is connected by conductor 93 to the remaining contact 88g of the switch 88. The switch 88 is of the holding type so that when the switch 81 is closed, it energizes the relay winding 88f and engages contacts 88e, 88c and 88a with contacts 88d, 88b and 88g, respectively. As the relay closes all contacts, it partially completes a circuit to the solenoid 71 from power terminal B through switch 81, conductor 89, contact 88b, winding 88f, contacts 88e, 88d, conductor 92, solenoid 71, and conductor 91. However, inasmuch as the switch 80 is normally open, the solenoid is not energized until the piston rod 18 rises and the switch 80 is closed by the contact arm 82a moving therewith. When the piston is fully raised, the switch 80 is closed with the result that the circuit through solenoid 71 is completed through conductor 91, switch 80, conductor 93, contacts 88g, 88a, conductor 87 and conductor 86 to power terminal A causing the armature 72 to move to the right and displacing the side valve 69 to discharge plastic into the melting cylinder. As the slide comes forward, it opens the normally closed switch 75 which opens the holding circuit through the relay coil 88f and deenergizes the solenoid 71. The slide valve 69 then is returned by the spring to its rearward position and the switch 75 is closed. However, the holding circuit through the relay 88 is open and the solenoid winding 71 will not be reenergized until the piston rod 18 displaces enough of the plastic from the melting cylinder to allow the arm 82b to again strike and close the switch 81. In other words, the piston 18 will move up and down through a distance controlled by the amount of plastic present in the melting chamber but unmelted plastic will be admitted to the melting chamber only when the amount of plastic remaining in the cylinder is decreased sufficiently to allow the ram or piston rod 18 to move down and close the switch 81.

The molding machine thus far described may be used for molding articles of many different sizes and is particularly effective for molding articles of small size, that is, weighing a gram or less. The device can, of course, be modified to mold larger articles but its principal field of use resides in its ability to be used to mold extremely small articles at high production rates.

By using a mold M of the type disclosed in Figs. 4 and 5 of the drawings, it is possible, for example, to mold the bottom stops on spiral types of fasteners in which the spiral or helically wound fastening elements are formed of nylon or similar flexible plastic. The mold M consists of a lower mold section M¹ having a pair of transverse grooves 100 and 101 extending part way across the top of the block making up the mold. The grooves 100 and 101 are adapted to receive the ends of the spiral fastening elements and are provided with narrower extensions 102 and 103 to receive the bead cords or guides of the fastener on the opposite side of a slot 104. The narrower grooves 102 and 103 aid in holding the fastener in alignment. Near the edge of and communicating with the slot 104 in the block is a mold cavity 105 which joins the two grooves 100 and 101 at their inner ends and determines the form of the stop or slug to be molded around the ends of the fastener elements.

Mounted within the slot 104 and reciprocable axially thereof is a plate 106 having an undercut hook 107 or claw on its upper end. The plate 104 and the plunger 108 on which it is mounted are normally biased upwardly by means of a spring 109 bearing against its lower end and the plug 110 in the bottom of an enlarged cylindrical extension of the slot 104.

The upper mold section M² which is secured to the platen 51 has an enlarged opening 111 therein in which is received an injection member 112 having a conical recess 113 therein to receive the conical end of the injection nozzle 35. The member 112 has a tubular extension 114 which extends down through the bottom of the top section and has an opening 115 therethrough of increasing diameter from top to bottom through which the plastic is introduced into the mold cavity 105. Adjacent to the lower end of the extension 114 is an undercut recess 116 in the under surface of the top mold section which forms the top of the mold cavity 105.

In operation, when the heating and molding unit 24 is forced downwardly by the downward movement of the piston 18, the nozzle 35 engages the recess 113 in the top of the member 112 and forces the member 112 downwardly, also depressing the plunger 106 and the hook 107 thereon by contact therewith so that the plunger 106 clears the inner end of the mold cavity 105 and allows plastic to flow into the mold cavity. When the piston 18 is retracted and the injection unit 24 is moved upwardly, the member 112 in the upper mold section M² is moved upwardly also by means of the springs 120 interposed between its under surface and the base of the recess therein. The upward movement of the member 112 enables the plunger 106 and the hook 107 also to move up so that the edge of the plunger 106 shears off the plastic at the inner end of the mold cavity 105, 116 and separates the molded stop from the body of plastic in the sprue opening. Continued upward movement of the upper mold section M² by means of the cylinder 56 results in the hook 107 withdrawing the cooled sprue from the sprue opening 115 in the member 112 and the sprue then can be blown off or knocked loose manually to clear the machine.

Figure 2:
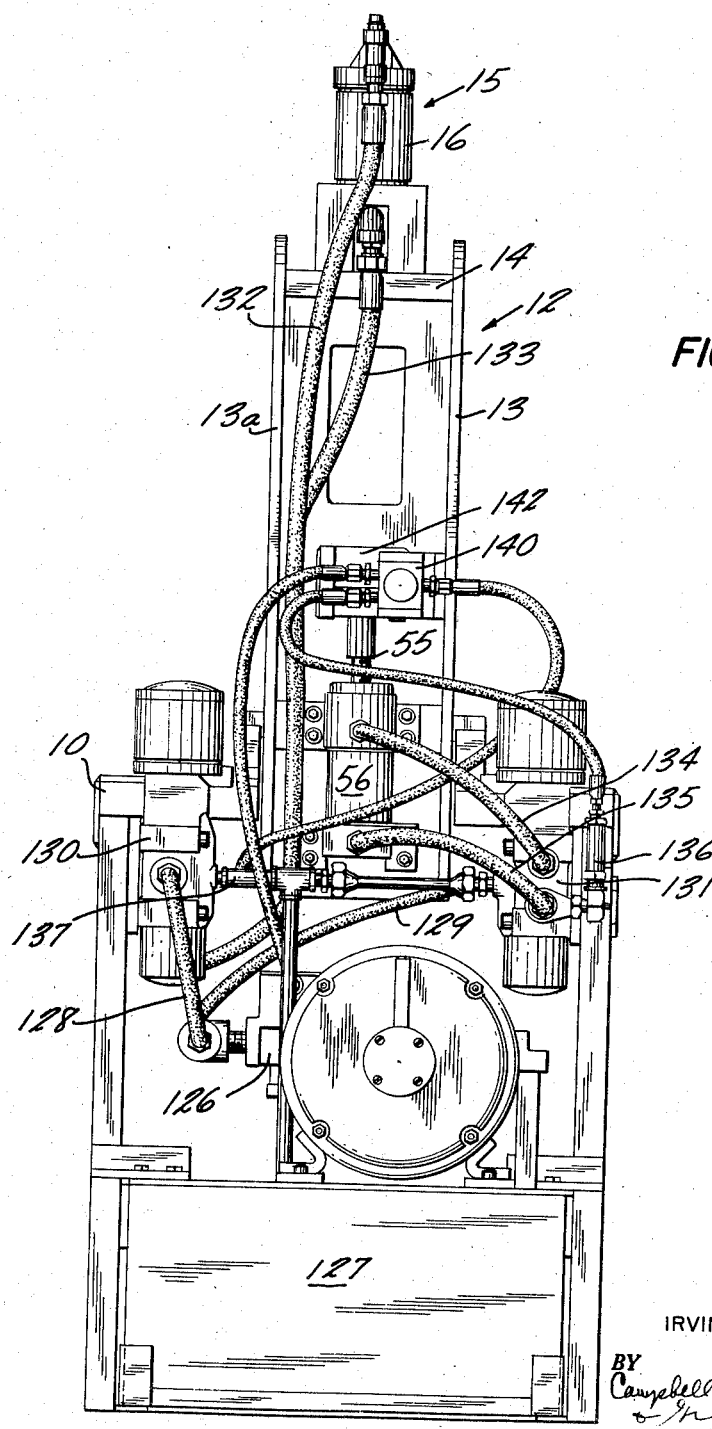
Fig. 2 is a view in side elevation of the machine of Fig. 1.

The operation of the cylinders 15 and 56 and associated mechanism may be manually controlled or automatically controlled as desired. Liquid pressure for actuating the apparatus may be supplied by means of an electric motor 125, Fig. 1, which drives a conventional gear or lobe type of pump 126 for pumping hydraulic fluid from a storage reservoir 127 mounted at the back of the machine and on which the motor and pump may be supported as shown in Figs. 1 and 2. The pump 126 supplies liquid through suitable hoses or conduits 128, 129 to the solenoid controlled selector valves 130 and 131 on opposite sides of the machine. The valve 130 is connected by means of conduits 132 and 133 to the cylinder 16. The solenoid controlled valve 131 is connected by conduits 134, 135 to the cylinder 56. Suitable relief or unloading valves 136 and 137 and couplings are provided for returning liquid to the reservoir. The relief valves may be connected to a conventional pilot valve 140 which regulates the flow of liquid through the system.

In operation, the device may be provided with a manually operated switch 141 which may be actuated to control the sequential operation of the solenoid valves 130 and 131 through the medium of a conventional timing switch, not shown. Thus, the switch 141 may be actuated to start the timer and also actuate the solenoid valve 136 which causes the piston rod 55 to be projected thereby closing the mold M. When the mold closes, a switch 142 is closed by the piston rod and this switch in turn actuates the solenoid valve 130 which causes the piston rod 18 to be projected. After the timer has operated the indicated time, it opens the circuit through the solenoid of the valve 130 allowing this valve to move and causing the piston rod 18 to be retracted. At the upper limit of retraction of the rod 18, it engages a switch 143 which releases the circuit holding the valve 131 and allowing the cylinder 56 to raise the platen 51 and open the mold.

If desired, a second manual control switch 145 may be provided by means of which the above sequence of operation is conducted manually.

The entire operating sequence described above including the injection of the plastic in the mold, the hardening of the plastic to render it form retaining and the opening of the mold and withdrawal of the molded article can take place in a period of about 5 to 10 seconds for an object of the size indicated so that a very high production can be maintained, especially if the machine is operated automatically. Automatic operation of the device is facilitated due to the fact that the slide fasteners can be fed to the device as continuous strips and the sops molded on them one after another. Of course the slide fasteners can be fed individually to the machine but the operation of the machine is then dependent on the skill of the operator and high production rates are not maintained as easily.

It will be understood that the operation of the device is not limited to the molding of slide fastener stops. Small articles such as grommets, washers, small gears and the like can be made with the machine at rates much higher than believed possible heretofore. It had been generally believed that "nylon" could not be molded and hardened in much less than 15 seconds per unit. The molding machine described above is capable of molding uniformly high quality stops from "nylon" at a rate of 400 to 500 stops per hour.

It will be understood that the molding apparatus is susceptible to considerable modification, particularly in the type of molds used therewith, as indicated above.

Also, many different kinds of automatic or manual controls may be provided for operating the ram and the air cylinder as may be desired. Accordingly, the form of the invention described herein should be considered as illustrative and not as limiting the scope of the following claims.

I claim:

1. An injection molding apparatus comprising a mold having a mold cavity therein to receive a charge of plastic weighing not more than a gram, a hollow cylinder above said mold to receive finely divided solid plastic material, a nozzle at the lower end of said cylinder having a portion engageable with said mold and an opening therein through which plastic is introduced into said mold, heating elements surrounding said cylinder and said nozzle to melt and maintain molten said solid plastic material, heat dissipating fins on said nozzle between said heating elements to regulate the fluidity and temperature of said plastic, a member within said cylinder and extending into said nozzle to maintain said molten plastic in a thin film in contact with the inside of said cylinder, and a plunger movable relative to said cylinder to enter it to force said plastic material out of said opening and retractable to enable solid plastic material to be fed into said cylinder.

2. An injection molding apparatus for molding small articles comprising a cylinder to receive finely divided plastic material, a heating element surrounding a portion of said cylinder to melt the plastic material therein, a plunger reciprocable in said cylinder to force the plastic lengthwise of the cylinder, a nozzle at one end of said cylinder through which said plastic material is extruded, heat dissipating fins on a portion of said nozzle for cooling it to reduce the temperature of the plastic and heating means on said nozzle outwardly of the cooling means to regulate the fluidity of the plastic material.

3. An injection molding apparatus comprising a cylinder to receive finely divided solid plastic material, a first hopper communicating with said cylinder, a second hopper for said plastic material, a movable feeding member interposed between said hoppers and having a cavity therein, means for moving said member to move said cavity alternately into communication with said hoppers to supply charges of said plastic material from said second hopper to said first hopper, a plunger reciprocable in said cylinder between a retracted position and an extended position to force the plastic material therethrough and eject it at one end of said cylinder, means to reciprocate said plunger in said cylinder, the extent of movement of said plunger in said cylinder increasing as the amount of plastic material in said cylinder decreases, electrically actuated means for moving said feed member to supply a charge of plastic material to said first hopper and said cylinder, a first normally open switch movable to closed position by movement of said plunger to retracted position, a second normally open switch movable to closed position in response to movement of said plunger to a predetermined position in said cylinder in which the plastic material in said cylinder is materially depleted, an electrical circuit connecting said electrically actuated means and said first and second switches with a source of electrical energy for actuating said electrical actuated means when both of said first and second switches are closed, and means actuated by movement of said feed member to a position supplying a charge of plastic material to said first hopper for opening said second switch.

4. A mold for injection molding small articles comprising a first mold section having a mold cavity in a surface thereof, and a recess adjacent to said mold cavity, a second mold section movable toward and away from said first section to open and close said mold cavity, a member having a sprue opening therein movably mounted in said second section for movement relative thereto and movement therewith toward and away from said recess and communicating with said cavity through said recess, a plunger in said recess forming a gate between said sprue opening and said cavity, said plunger being movable in response to movement of said member relative to said second section toward said recess to uncover said cavity for introduction of plastic therein, and means to move said plunger to cut off communication between said cavity and said sprue opening upon movement of said member away from said recess.

5. The mold set forth in claim 4 comprising a hooklike element fixed to said plunger and extending into said sprue opening, said element being engageable in the plastic in said sprue opening to remove the plastic in said sprue opening therefrom upon movement of said second mold section away from said first mold section.

6. An injection molding apparatus for molding small articles comprising a cylinder to receive plastic material, a heating element surrounding said cylinder to melt the plastic material therein, a member in said cylinder and partially filling it to cause the plastic material to flow in a thin layer adjacent to the wall of the cylinder, a nozzle at one end of said cylinder through which said plastic material is ejected, heating means surrounding the nozzle to maintain the plastic material molten therein, a plunger movable into and out of said cylinder to force the plastic material out of said nozzle, a mold having upper and lower sections, means supporting said mold sections for relative opening and closing movement, said mold sections having a recess therein forming a mold cavity, an injection member in one of said mold sections having a sprue opening therein and movable relative to said mold sections, a cutoff member mounted movably in the other mold section and displaceable by said injection member to uncover said mold and allow plastic material to be injected into said mold cavity, means responsive to said movement of said injection member to move said cutoff member to shear off the plastic between said injection member and said cavity, and a hook member extending from said cutoff member into the path of the plastic flowing from said injection member into said mold, said hook member engaging the plastic material in said sprue opening to withdraw it from said opening when the mold sections are opened.

7. An injection molding apparatus comprising a hollow cylinder to receive finely divided plastic material, means for heating said plastic material in said cylinder to render it fluent, a mold having a capacity which is a fraction of the capacity of said cylinder, a plunger in said cylinder, means for reciprocating said plunger between a retracted position and an extended position in said cylinder to eject fluent plastic into and fill said mold, said plunger being movable progressively greater distances from said retracted position into said cylinder as the plastic material therein is depleted by repeated injections into said mold, a hopper to receive finely divided plastic material, a chute for delivering plastic into said cylinder, a feeding member movable to communicate alternately with said hopper and said chute, electrical means for moving said feeding member to receive plastic material from said hopper and discharge it into said chute, and a control system including a first control switch closed by movement of said plunger to a projected position in said cylinder in which the plastic material in said cylinder is materially depleted, and a second control switch electrically connected with said first switch and closed by return of said plunger substantially to said retracted position to complete an electrical circuit between said electrical means and a source of electrical energy for moving said feeding means to supply said plastic to said chute and means actuated by movement of said feeding member into communication with said chute for opening said first switch.

References Cited in the file of this patent

UNITED STATES PATENTS

| | | |
|---|---|---|
| 2,159,559 | Lawyer | May 23, 1939 |
| 2,217,661 | Anderson | Oct. 15, 1940 |
| 2,282,308 | Dahlin | May 12, 1942 |
| 2,431,843 | Swoger | Dec. 2, 1947 |
| 2,460,831 | Kovacs | Feb. 8, 1949 |
| 2,465,799 | Gravesen | Mar. 29, 1949 |
| 2,497,951 | Low | Feb. 21, 1950 |
| 2,570,613 | Vinal | Oct. 9, 1951 |
| 2,600,958 | Barton | June 17, 1952 |
| 2,627,086 | Hallenbeck | Feb. 3, 1953 |
| 2,627,087 | Hendry | Feb. 3, 1953 |
| 2,676,357 | Shannon | Apr. 27, 1954 |